June 25, 1946.  A. J. KINDIG ET AL  2,402,897
CLUTCH
Filed April 10, 1945  3 Sheets-Sheet 1

Patented June 25, 1946

2,402,897

UNITED STATES PATENT OFFICE 2,402,897

CLUTCH

Arnie J. Kindig and John W. Homer, Chambersburg, Pa., assignors to T. B. Wood's Sons Company, Chambersburg, Pa., a corporation of Pennsylvania Application April 10, 1945, Serial No. 587,468

12 Claims. (Cl. 192—68)

This invention relates to clutches adapted for general application in power transmission machinery, and particularly to clutches having elements which move axially for engagement and disengagement. The invention is well adapted for clutches of the axially engaging multiple disc type.

An object of this invention is to provide a clutch of the above-mentioned type which is of particularly short length.

A further object of the invention is to provide a clutch of this type which is well adapted and arranged for the making of adjustments to regulate the operation and to compensate for wear of the friction elements and the like.

A still further object of the invention is to provide a clutch of the type herein disclosed with means for positively releasing the engagement.

Another object of the invention is to provide a compensatory adjustment arrangement whereby a slidable pressure-applying mechanism and the outside clutch plate are adjustably connected by means of a nut.

Another object of this invention is to provide a clutch of the type hereinbefore set forth and in which means is provided for positively moving a clutch element axially out of engagement with the opposing clutch element, thus providing positive release of the driving engagement between said elements.

Another object of the invention is to provide a locking means for positively locking together the outside plate of the clutch with the pressure plate, whereby actuating movements applied to the pressure plate for engaging and releasing the clutch are positively transmitted to the outside driving plate, thus providing for positive actuation in both directions of operation.

Still another object of this invention is to provide an arrangement in which one clutch plate is provided with an extending hub which has a series of teeth, which teeth are engaged by teeth of the other clutch plate and of the pressure-applying member in separate and distinct manner so that said other plate and pressure member can be adjusted relatively.

In the accompanying drawings, which show the invention only by way of illustration and without limiting the scope thereof, Fig. 1 is a longitudinal sectional view of the clutch with the plates engaged;

Figure 1:
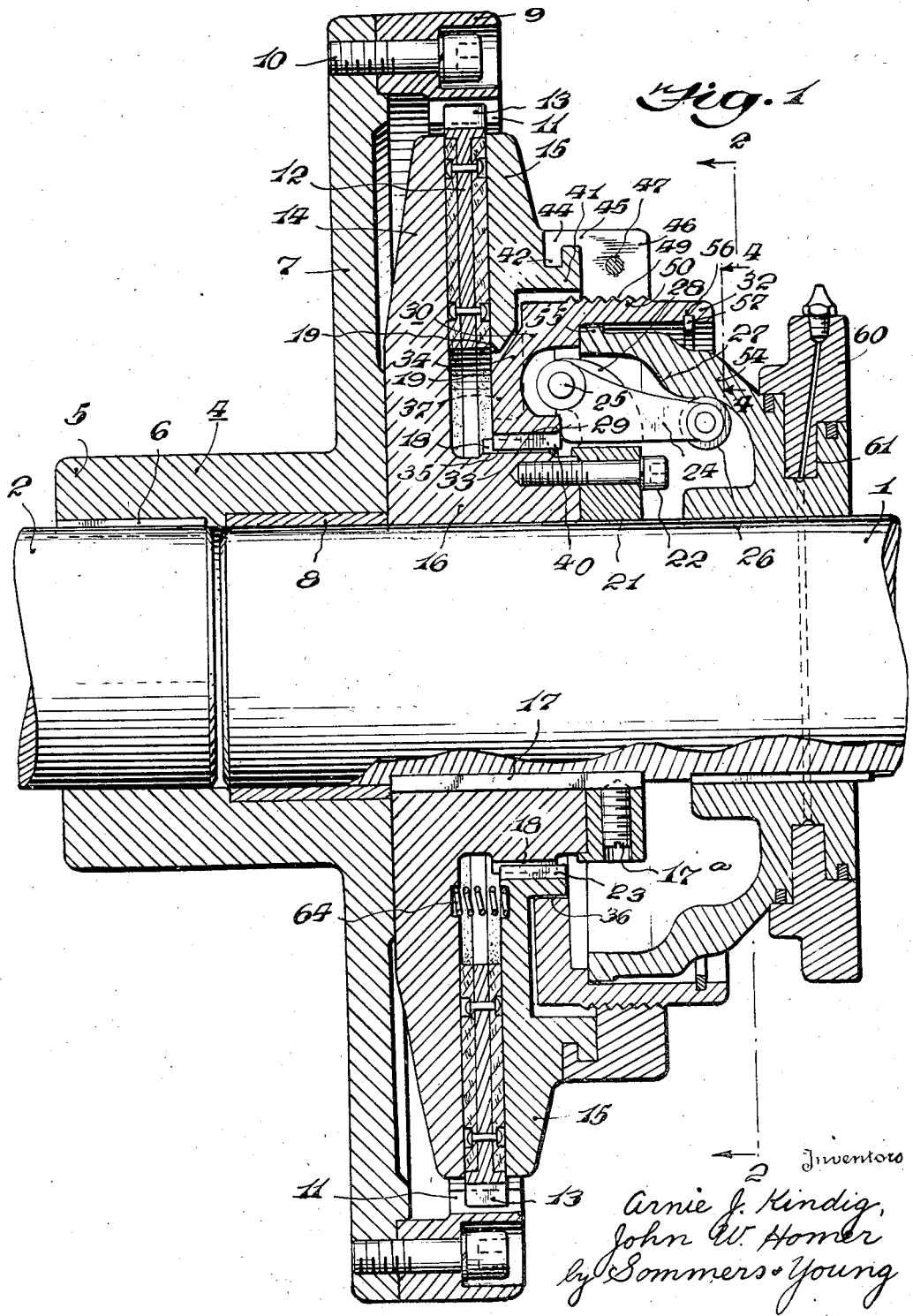
Figure 2:
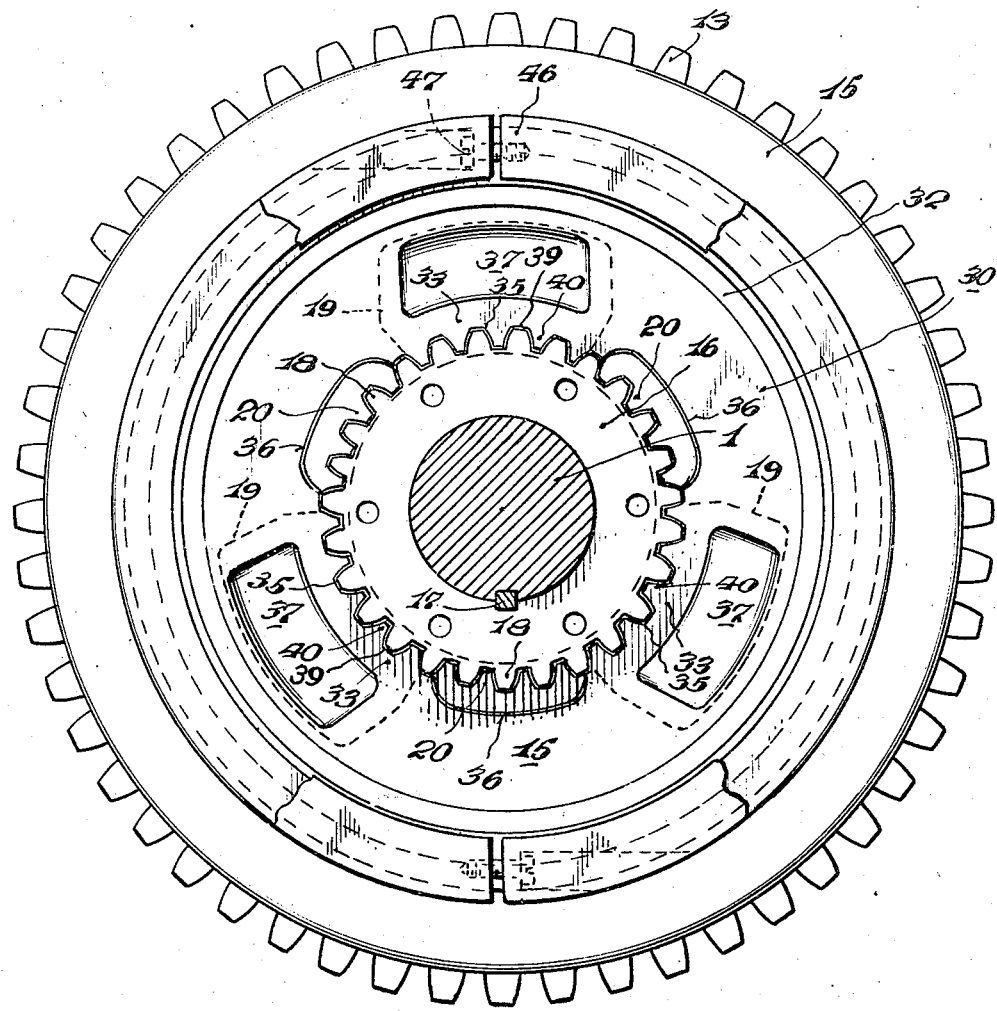
Fig. 2 is a transverse sectional view of the line 2—2 of Fig. 1.
Figure 3:
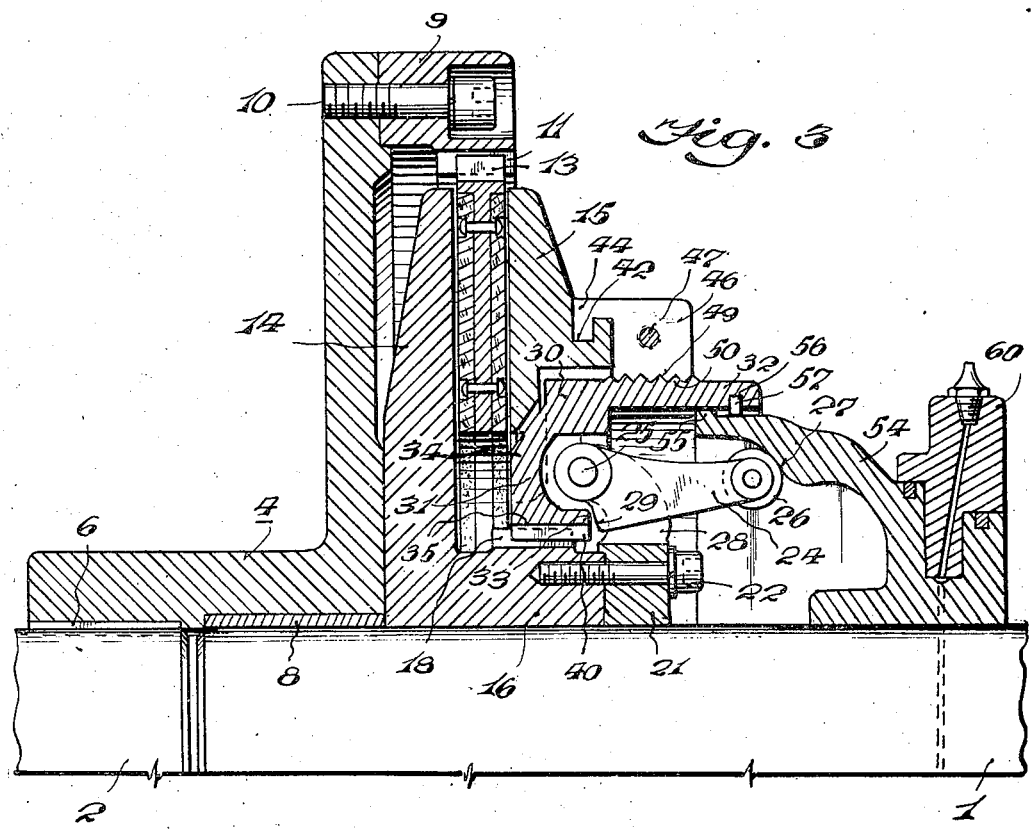
Fig. 3 is a side sectional view of part of the clutch showing the plates disengaged.
Figure 4:
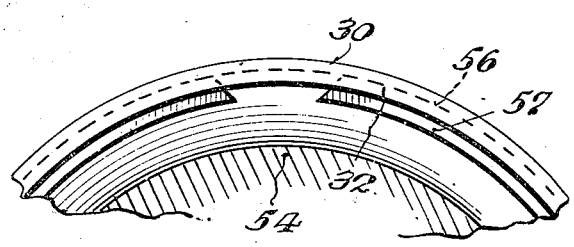
Fig. 4 is a fragmentary transverse sectional view on the line 4—4 of Fig. 1.

In the drawings numerals 1 and 2 indicate the respective parts of a shaft to be coupled or uncoupled for transmitting or interrupting rotary motion therebetween. Although the invention is herein illustrated as applied to the coupling of shafts, it is to be understood that it is also applicable to clutches of the plain sleeve type for power take-off, in which case a shaft having no break therein could be employed and the power would be transmitted relative to a member of the clutch to or from any other rotatable member. Numeral 4 refers to a bell which is keyed on one portion of the shaft, for example, the portion 2. The bell member 4 may be provided with an elongated tubular portion 5 extending along the shaft 2 and keyed thereto by key member 6, and at one end the bell has an outwardly extending plate 7 having a ring-shaped member 9, which may be attached thereto by bolts 10. The tubular portion 5 of the bell member may extend beyond the end of shaft portion 2 along the shaft portion 1 and thus may serve as a steadying guide for the end of shaft portion 1. For reducing friction between shaft portion 1 and tubular portion 4 a bearing or bushing of any suitable type, shown herein as a bronze bushing 8, may be inserted in portion 5. The ring member 9 is provided on its inner face with one or a series of tooth-shaped lugs 11. Extending inwardly from said teeth is a friction disc 12 having one or more teeth or lug members 13 at its outer edge corresponding to and engaging with the tooth or series of teeth 11 of ring 9. The inner portion of the friction disc 12 is cut away to provide space for the hub portions of other elements to be hereinafter described. The clutching action is produced by drawing together against the faces of friction disc 12 a pair of plates which are designated inside plate 14 and outside plate 15. The structure described up to the present point is in general substantially conventional in clutches of the type in question, the improvements according to the present invention residing in features and combinations hereinafter described.

The inner portion of the inside driving plate 14 is provided with an axially extending hub portion 16 which fits on and is keyed to shaft portion 1 by key 17. On the outer surface of said hub 16 is provided a ring of teeth 18 extending therearound. This ring of teeth is located, in general, in a position which is radially inwardly disposed from the outside driving plate 15. At its inner portion the outside driving plate is provided with an opening 23 of generally circular shape and is interrupted at several places by recesses 19 extending outwardly from the central opening.

At the portions of said opening in the outside driving plate not interrupted by the recesses 19, the inner surface is provided with one or a series of teeth 20 engaging with teeth 18 on hub 16. The inner plate 14 and outer plate 15 are thus adapted to be moved axially but not rotationally relative to each other.

Adjacent the end of hub portion 16 of inner plate 14 is located a fulcrum ring 21 which is fixed to inside driving plate 14 by bolts 22 and connected with shaft 1 by key 17 and set screw 17a, which locks fulcrum ring 21 and, thereby, inner driving plate 14 relative to shaft 1. At peripherally spaced points around said fulcrum ring are located a plurality of curved arms 28 extending first outwardly and then axially toward the clutch plates. These arms are provided at their outer end portions with transversely extending journals which serve as fulcrums for operating levers 24 having pins 25 extending through the journals. The levers 24 are provided at their ends opposite the fulcrums with rollers 26 adapted to be engaged by an operating cam 27, to be described later, and the levers are also provided on their underneath sides with shoulders 29 facing toward the driving plates and adapted to engage with adjacent abutment portions 33 of a slidable pressure member which may be in the form of a ring 30. The pressure ring 30 comprises, in general, a portion 31 of generally disc shape and an axially extending flange 32 at its outer edge, extending away from the driving plates. The disc-shaped portion 31 of the pressure ring is formed with a bulge 34 in the direction of the driving plates, and its central portion has an opening 35 through which extends the hub portion 16 of inside plate 14. Additionally, the pressure ring is cut away at positions 36 extending outwardly from the central recess, and the positions of the recesses 36 thus formed alternate in angular position with the angular positions of the recesses 19 of the outside driving plate 15. The recesses 19 of driving plate 15 are of sufficient angular and radial extent to accommodate the solid portions 37 of the bulged pressure ring, so that the outer driving plate 15 and the solid bulged portions 37 of the pressure ring interfit and occupy substantially the same axial position. The inner edges 39 of the solid portions 37 are provided with teeth 40 engaging with teeth 18 on the hub 16 of the inside driving plate 14 and are axially slidable relative thereto but hold the inside plate and the pressure plate against relative rotation.

The outside driving plate 15 has on its outer face a flange 41 which is provided with an outwardly facing circular recess 42 in its outer face, and into this recess fits one or more inwardly extending tongues 44 formed on one or more circular flanges 45 of a split nut 46. Nut 46 is held together in operative and adjusted position by bolts 47. On its inner surface nut 46 is provided with screw threads 49 engaging with corresponding threads 50 on the outer surface of flange 32 of pressure member 30. It is apparent that by turning nut 46 the relative position of outside driving plate is altered and adjusted relative to pressure ring 30 and also to inside driving plate 14, thus allowing for compensation for wear of the surfaces of friction disc 12 and driving discs 14 and 15.

For operating the clutch there is provided an operating member 54 which is slidable on shaft portion 1. The operating member is generally of bell shape and its inner surface is formed with an operating cam surface 27 which, when pressed forward toward the clutch plates, forces the cam rollers and the ends of levers 24 inwardly, while fulcrum ring 21, acting through bolts 22, draws the inside driving plate 14 against the friction disc 12. When the outer ends of levers 24 are thus forced inwardly by the cam, the shoulders 29 press against abutments 33 of the pressure ring 30 and force it to the left against the friction disc 12 which is engaged on its other side by the inside driving plate 14.

The operating member or bell 54 has an outwardly extending flange 55 at its inside edge which extends in close proximity to the inside of flange 32 of the pressure plate. Toward its outer end and located on its inside the flange 32 has a circular recess 56 in which fits a snap ring 57 which extends inwardly from the inside surface of the flange a sufficient distance to engage flange 55 of the operating member when it is moved to the right in a clutch-disengaging operation. Since the pressure plate is connected with the outside driving plate 15 as previously explained, through screw threads 49, 50 and the engagement of tongue 44 of nut 46 in recess 42 of plate 15, the engagement of flange 55 with snap ring 57 will positively pull driving plate 15 away from the friction disc 12 and thus positively release the plate 15 from disc 12 in case it should tend to adhere thereto.

The operating member or bell 54 is actuated in conventional manner by a ring 60 which seats in a recess 61 in the operating member and is moved by any conventional means, such as lever or other means not shown.

For placing the clutch in power transmitting condition with the driving plates 14 and 15 in engagement with the friction disc 12, the operating bell 54 with cam 27 is moved toward the left, and cam 27 forces the roller ends of the levers 24 inwardly. Through the prying action developed betwen the fulcrums 25 and shoulders 29 acting against abutments 33 of pressure member 30, the outside driving plate 15 and friction disc 12 are forced to the left against inside driving plate 14. In so doing the springs 64 which are located at spaced points around the axis of the clutch are put in compressed condition.

For releasing the clutch to interrupt the drive, operating bell member 54 is moved to the right, whereby the roller ends of levers 24 are free to move outwardly under the influence of axial pressure from springs 64 and centrifugal force to the outer level of cam 27. This releases the pressure on disc 12 between the inside driving plate 14 and outside driving plate 15. At this time separating spring members 64 tend to press the clutch plates 14 and 15 apart and also serve to keep rollers 26 constantly in engagement with operating bell 54. In case the release of the plates and influence of springs 64 should not cause the plates to disengage from the friction disc, the flange 55 at the edge of the operating bell will engage split ring 57 and positively pull the plate 15 away from the friction disc and release the driving engagement.

In case the clutch should get out of adjustment because of wear of the friction disc or driving plates, and for initially placing the parts in proper adjustment, the bolts 47 of nut 46 are loosened and the nut is turned up or back to the proper position and is then locked by tightening bolts 47, thus causing parts 15, 46, and 30 to become a rigid body for transmitting engaging pressures to parts 15, 12, and 14. It is apparent that movement of nut 46 causes a relative movement between the driving plates and pressure plate 30 which determines the positions of the driving plates relative to the friction disc 12 and the pressure exerted thereagainst by the driving plates.

We claim:

1. In a clutch of the type having engageable plates adapted to move axially relatively for establishing and interrupting driving engagement, means for preventing relative rotation between said plates, a disc between said plates against which said plates frictionally engage for the transmission of rotary power, a pressure member adjacent one of said plates, the plate adjacent the pressure member having central recesses extending outwardly from its central portion, the pressure member being bulged at its center toward said adjacent plate and having recesses extending outwardly from its central portion located in position corresponding to the parts of the central portion of the adjacent plate between the said recesses of said adjacent plate whereby the bulged portion of the pressure member interfits with the central portion of the adjacent plate when brought together, means on the inner edge of the pressure member for preventing relative rotation between the adjacent plate and the pressure member, said rotation preventing means being located in substantially the same transverse plane as the adjacent plate, and lever means fulcrumed with respect to one of said plates and engaging the other plate for pressing one of said plates toward the other against the disc to establish driving connection.

2. In a clutch of the type having engageable plates adapted to move axially relatively for establishing and interrupting driving engagement, means for preventing relative rotation between said plates, a disc between said plates against which said plates frictionally engage for the transmission of rotary power, a pressure member adjacent one of said plates, the plate adjacent the pressure member having central recesses extending outwardly from its central portion, the pressure member being bulged at its center toward said adjacent plate and having recesses extending outwardly from its central portion located in position corresponding to the parts of the central portion of the adjacent plate between the said recesses of said adjacent plate whereby the bulged portion of the pressure member interfits with the central portion of the adjacent plate when brought together, means on the inner edge of the pressure member for preventing relative rotation between the adjacent plate and the pressure member, said rotation preventing means being located in substantially the same transverse plane as the adjacent plate, lever means fulcrumed with respect to one of said plates and engaging the other plate for pressing one of said plates toward the other against the disc to establish driving connection, means for securing the pressure member adjustably to the adjacent plate, and means for locking said pressure member and the adjacent plate in adjusted position to form a unitary assembly including said plate, the pressure member and the adjusting and locking means.

3. In a clutch of the type having engageable plates adapted to move axially relatively for establishing and interrupting driving engagement, means for preventing relative rotation between said plates, a disc between said plates against which said plates frictionally engage for the transmission of rotary power, a pressure member adjacent one of said plates, the plate adjacent the pressure member having central recesses extending outwardly from its central portion, the pressure member being bulged at its center toward said adjacent plate and having recesses extending outwardly from its central portion located in position corresponding to the parts of the central portion of the adjacent plate between the said recesses of said adjacent plate whereby the bulged portion of the pressure member interfits with the central portion of the adjacent plate when brought together, means on the inner edge of the pressure member for preventing relative rotation between the adjacent plate and the pressure member, said rotation preventing means being located in substantially the same transverse plane as the adjacent plate, lever means fulcrumed with respect to one of said plates and engaging the other plate for pressing one of said plates toward the other against the disc to establish driving connection, means for securing the pressure member adjustably to the adjacent plate, means for locking said pressure member and the adjacent plate in adjusted position to form a unitary assembly including said plate, the pressure member and the adjusting and locking means, and means for positively moving the pressure member in the direction to move the adjacent plate, locked thereto, into engagement with the friction disc.

4. In a clutch of the type having engageable plates adapted to move axially relatively for establishing and interrupting driving engagement, means for preventing relative rotation between said plates, a disc between said plates against which said plates frictionally engage for the transmission of rotary power, a pressure member adjacent one of said plates, the plate adjacent the pressure member having central recesses extending outwardly from its central portion, the pressure member being bulged at its center toward said adjacent plate and having recesses extending outwardly from its central portion located in position corresponding to the parts of the central portion of the adjacent plate between the said recesses of said adjacent plate whereby the bulged portion of the pressure member interfits with the central portion of the adjacent plate when brought together, means on the inner edge of the pressure member for preventing relative rotation between the adjacent plate and the pressure member, said rotation preventing means being located in substantially the same transverse plane as the adjacent plate, lever means fulcrumed with respect to one of said plates and engaging the other plate for pressing one of said plates toward the other against the disc to establish driving connection, means for securing the pressure member adjustably to the adjacent plate, means for locking said pressure member and the adjacent plate in adjusted position to form a unitary assembly including said plate, the pressure member and the adjusting and locking means, and means for positively moving the pressure member in the direction to move the adjacent plate, locked thereto, out of engagement with the friction disc.

5. In a clutch of the type having engageable plates adapted to move axially relatively for establishing and interrupting driving engagement, means for preventing relative rotation between said plates, a disc between said plates against which said plates frictionally engage for the transmission of rotary power, a pressure member adjacent one of said plates, the plate adjacent the pressure member having central recesses extending outwardly from its central portion, the pressure member being bulged at its center toward said adjacent plate and having recesses extending outwardly from its central portion located in position corresponding to the parts of the central portion of the adjacent plate between the said recesses of said adjacent plate whereby the bulged portion of the pressure member interfits with the central portion of the adjacent plate when brought together, means on the inner edge of the pressure member for preventing relative rotation between the adjacent plate and the pressure member, said rotation preventing means being located in substantially the same transverse plane as the adjacent plate, lever means fulcrumed with respect to one of said plates and engaging the other plate for pressing one of said plates toward the other against the disc to establish driving connection, means for securing the pressure member adjustably to the adjacent plate, means for locking said pressure member and the adjacent plate in adjusted position to form a unitary assembly including said plate, the pressure member and the adjusting and locking means, means for positively moving the pressure member in the direction to move the adjacent plate, locked thereto, into engagement with the friction disc, and means for positively moving the pressure member in the direction to positively move the adjacent plate, locked thereto, out of engagement with the friction disc.

6. In a clutch of the type having engageable plates adapted to move axially relatively for establishing and interrupting driving engagement, means for preventing relative rotation between said plates, a disc between said plates against which said plates frictionally engage for the transmission of rotary power, a pressure member adjacent one of said plates, the plate adjacent the pressure member having central recesses extending outwardly from its central portion, the pressure member being bulged at its center toward said adjacent plate and having recesses extending outwardly from its central portion located in position corresponding to the parts of the central portion of the adjacent plate between the said recesses of said adjacent plate whereby the bulged portion of the pressure member interfits with the central portion of the adjacent plate when brought together, means on the inner edge of the pressure member for preventing relative rotation between the adjacent plate and the pressure member, said rotation preventing means being located in substantially the same transverse plane as the adjacent plate, lever means fulcrumed with respect to one of said plates and engaging the other plate for pressing one of said plates toward the other against the disc to establish driving connection, a rotatable power transmission member located interiorly of the pressure member and the plate adjacent said pressure member, and means for individually drivingly connecting said pressure member and adjacent plate with said interior power transmission member.

7. In a clutch of the type having engageable plates adapted to move axially relatively for establishing and interrupting driving engagement, means for preventing relative rotation between said plates, a disc between said plates against which said plates frictionally engage for the transmission of rotary power, a pressure member adjacent one of said plates, the plate adjacent the pressure member having central recesses extending outwardly from its central portion, the pressure member being bulged at its center toward said adjacent plate and having recesses extending outwardly from its central portion located in position corresponding to the parts of the central portion of the adjacent plate between the said recesses of said adjacent plate whereby the bulged portion of the pressure member interfits with the central portion of the adjacent plate when brought together, means on the inner edge of the pressure member for preventing relative rotation between the adjacent plate and the pressure member, said rotation preventing means being located in substantially the same transverse plane as the adjacent plate, lever means fulcrumed with respect to one of said plates and engaging the other plate for pressing one of said plates toward the other against the disc to establish driving connection, a rotatable power transmission member located interiorly of the pressure member and the plate adjacent said pressure member, and means for individually directly drivingly connecting said pressure member and adjacent plate with said interior power transmission member.

8. In a clutch of the type having engageable drive plates adapted to move axially for establishing and interrupting driving engagement, one of said plates having an axially extending hub, means on a second drive plate for engaging the hub of said one drive plate to prevent relative rotation therebetween, a disc between said plates against which said plates frictionally engage for the transmission of rotary power, a pressure plate adjacent the said second drive plate, said second drive plate having central recesses extending outwardly from the hub of said one plate, the pressure plate being bulged at its center toward the second plate and having recesses extending outwardly from its central portion located in position corresponding to the parts of the central portion of the second plate between the said recesses of the second plate whereby the bulged portion of the pressure plate interfits with the central portion of the second plate when brought together, means on the inner edge of the pressure plate for engaging the hub of the first plate to prevent relative rotation between said first plate and the pressure plate, said last engagement being in substantially the same transverse plane as the engagement of the second plate with said hub, and lever means fulcrumed with respect to one of said drive plates and engaging the other drive plate for pressing said drive plates together against the disc to establish driving connection.

9. In a clutch of the type having engageable drive plates adapted to move axially for establishing and interrupting driving engagement, one of said plates having an axially extending hub having a set of radially extending teeth thereon, at least one tooth on a second drive plate for engaging the hub of said one drive plate to prevent relative rotation therebetween, a disc between said plates against which said plates frictionally engage for the transmission of rotary power, a pressure plate adjacent the said second drive plate, said second drive plate having central recesses extending outwardly from the hub of said one plate, the pressure plate being bulged at its center toward the second plate and having recesses extending outwardly from its central portion located in position corresponding to the parts of the central portion of the second plate between the said recesses of the second plate whereby the bulged portion of the pressure plate interfits with the central portion of the second plate when brought together, tooth means on the inner edge of the pressure plate for engaging the teeth on the hub of the one drive plate to prevent relative rotation, said tooth means of the pressure plate being located in substantially the same transverse plane as the said tooth of the said second drive plate, and lever means fulcrumed with respect to one of said drive plates and engaging the other drive plate for pressing said drive plates together against the disc to establish driving connection.

10. In a clutch of the type having engageable drive plates adapted to move axially for establishing and interrupting driving engagement, one of said plates having an axially extending hub, means on a second drive plate for engaging the hub of said one drive plate to prevent relative rotation therebetween, a disc between said plates against which said plates frictionally engage for the transmission of rotary power, a pressure plate adjacent the said second drive plate, means for securing the pressure plate in axially fixed relation to the second drive plate, means for altering the relative position of the pressure plate and second drive plate, said second drive plate having central recesses extending outwardly from the hub of said one plate, the pressure plate being bulged at its center toward the second plate and having recesses extending outwardly from its central portion located in position corresponding to the parts of the central portion of the second plate between the said recesses of the second plate whereby the bulged portion of the pressure plate interfits with the central portion of the second plate when brought together, means on the inner edge of the pressure plate for engaging the hub of the first plate to prevent relative rotation, said last engagement being in substantially the same transverse plane as the engagement of the second plate with said hub, and lever means fulcrumed with respect to one of said drive plates and engaging the other drive plate for pressing said drive plates together against the disc to establish driving connection.

11. In a clutch of the type having engageable drive plates adapted to move axially for establishing and interrupting driving engagement, one of said plates having an axially extending hub, means on a second drive plate for engaging the hub of said one drive plate to prevent relative rotation therebetween, a disc between said plates against which said plates frictionally engage for the transmission of rotary power, a pressure plate adjacent the said second drive plate, said pressure plate having an axially extending screw-threaded surface, said second plate having a circular groove opening radially and provided with forwardly and rearwardly facing surfaces, a split nut having a tongue engaging in said groove and having screw threads engaging the screw threads of the pressure plate, means for holding the parts of said split nut together and tightening said nut so as to be locked with respect to the pressure plate threads, and for loosing said nut to enable adjustment of the pressure plate relative to the second drive plate by turning said nut, said second drive plate having central recesses extending outwardly from the hub of said one plate, the pressure plate being bulged at its center toward the second plate and having recesses extending outwardly from its central portion located in position corresponding to the parts of the central portion of the second plate between the said recesses of the second plate whereby the bulged portion of the pressure plate interfits with the central portion of the second plate when brought together, means on the inner edge of the pressure plate for engaging the hub of the first plate to prevent relative rotation, said last engagement being in substantially the same transverse plane as the engagement of the second plate with said hub, and lever means fulcrumed with respect to one of said drive plates and engaging the other drive plate for pressing said drive plates together against the disc to establish driving connection.

12. In a clutch of the type having engageable drive plates adapted to move axially for establishing and interrupting driving engagement, one of said plates having an axially extending hub, means on a second drive plate for engaging the hub of said one drive plate to prevent relative rotation therebetween, a disc between said plates against which said plates frictionally engage for the transmission of rotary power, a pressure plate adjacent the said second drive plate, said second drive plate having central recesses extending outwardly from the hub of said one plate, the pressure plate being bulged at its center toward the second plate and having recesses extending outwardly from its central portion located in position corresponding to the parts of the central portion of the second plate between the said recesses of the second plate whereby the bulged portion of the pressure plate interfits with the central portion of the second plate when brought together, means on the inner edge of the pressure plate for engaging the hub of the first plate to prevent relative rotation, said last engagement being in substantially the same transverse plane as the engagement of the second plate with said hub, lever means fulcrumed with respect to one of said drive plates and engaging the other drive plate for pressing said drive plates together against the disc to establish driving connection, said pressure plate having a flange extending axially and formed with a circular recess, a split snap ring in said recess, an operating cam bell for operating said levers, and an abutment on said operating bell for engaging said split ring when the operating bell is moved to the position corresponding to disengaged position of the clutch for pulling the pressure plate and the second drive plate secured thereto out of driving contact with the friction disc.

ARNIE J. KINDIG.
JOHN W. HOMER.